US007197164B2

(12) United States Patent
Levy

(10) Patent No.: US 7,197,164 B2
(45) Date of Patent: Mar. 27, 2007

(54) TIME-VARYING VIDEO WATERMARK

(75) Inventor: Kenneth L. Levy, Stevenson, WA (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 11/265,766

(22) Filed: Nov. 1, 2005

(65) Prior Publication Data

US 2006/0120559 A1 Jun. 8, 2006

Related U.S. Application Data

(63) Continuation of application No. 09/951,142, filed on Sep. 10, 2001, now Pat. No. 6,961,444.

(60) Provisional application No. 60/232,163, filed on Sep. 11, 2000.

(51) Int. Cl.
*H04K 1/00* (2006.01)

(52) U.S. Cl. .................. 382/100; 348/463; 348/467

(58) Field of Classification Search ............... 382/100, 382/232; 713/176; 380/201, 210, 252, 287, 380/54; 348/461, 463, 467
See application file for complete search history.

(56) References Cited

U.S. PATENT DOCUMENTS

| 4,969,041 A | 11/1990 | O'Grady et al. ............ 385/142 |
| 5,200,822 A | 4/1993 | Bronfin et al. ............... 358/142 |
| 5,745,604 A | 4/1998 | Rhoads ....................... 382/232 |
| 5,809,139 A | 9/1998 | Girod et al. .................... 380/5 |
| 5,915,044 A | 6/1999 | Gardos et al. .............. 382/236 |
| 5,930,377 A | 7/1999 | Powell et al. ............... 382/100 |
| 6,005,643 A | 12/1999 | Morimoto et al. .......... 348/845 |
| 6,026,193 A | 2/2000 | Rhoads ....................... 382/232 |
| 6,122,403 A | 9/2000 | Rhoads ....................... 382/233 |
| 6,211,919 B1 | 4/2001 | Zink et al. ................... 348/473 |

(Continued)

FOREIGN PATENT DOCUMENTS

EP  1039414 A2  9/2000

(Continued)

OTHER PUBLICATIONS

Lee et a., "Adaptive Video Watermarking Using Motion Information," Proc. SPIE vol. 3971: Security and Watermarking of Multimedia Contents II, Jan. 2000, pp. 209-216.*

(Continued)

*Primary Examiner*—Andrew W. Johns
(74) *Attorney, Agent, or Firm*—Digimarc Corporation

(57) ABSTRACT

A digital watermark embedder reduces a watermark signal as a function of time varying properties of video such that a watermark that would otherwise be static over frames is selectively reduced to make it imperceptible. The method computes a watermark signal corresponding to locations within a frame, where the watermark signal is mapped to locations in the video frame and is computed based upon attributes of the video within the frame. The method varies the strength of the watermark signal over time. The process of varying the strength includes reducing the strength of the watermark signal to make the digital watermark less perceptible in the video in locations where the video has time varying properties. The method embeds the watermark signal into the video at the locations with the varying strength.

20 Claims, 1 Drawing Sheet

U.S. PATENT DOCUMENTS

| | | | |
|---|---|---|---|
| 6,226,387 B1 * | 5/2001 | Tewfik et al. | 382/100 |
| 6,229,924 B1 | 5/2001 | Rhoads et al. | 382/232 |
| 6,282,299 B1 | 8/2001 | Tewfik et al. | 382/100 |
| 6,334,187 B1 | 12/2001 | Kadono | 713/176 |
| 6,411,725 B1 | 6/2002 | Rhoads | 382/100 |
| 6,449,379 B1 | 9/2002 | Rhoads | 382/100 |
| 6,563,936 B2 | 5/2003 | Brill et al. | 382/100 |
| 6,661,905 B1 | 12/2003 | Chupp et al. | 382/100 |
| 6,674,876 B1 | 1/2004 | Hannigan et al. | 382/100 |
| 2001/0053237 A1 | 12/2001 | Hashimoto et al. | 382/100 |
| 2002/0085736 A1 | 7/2002 | Kalker et al. | 382/100 |
| 2002/0087864 A1 | 7/2002 | Depovere et al. | 713/176 |
| 2002/0094082 A1 | 7/2002 | Jones et al. | 380/219 |
| 2002/0106106 A1 | 8/2002 | Sato | 382/100 |
| 2002/0164046 A1 | 11/2002 | Walker et al. | 382/100 |
| 2002/0172394 A1 | 11/2002 | Venkatesan et al. | 382/100 |
| 2002/0191810 A1 | 12/2002 | Fudge et al. | 382/100 |
| 2003/0021439 A1 | 1/2003 | Lubin et al. | 382/100 |
| 2003/0091213 A1 | 5/2003 | Yamakage et al. | 382/100 |
| 2004/0120523 A1 | 6/2004 | Haitama et al. | 380/239 |
| 2004/0250079 A1 | 12/2004 | Kalker et al. | 713/176 |

FOREIGN PATENT DOCUMENTS

| | | |
|---|---|---|
| EP | 1217840 A2 | 6/2002 |
| EP | 0966837 B1 | 7/2002 |
| JP | 05-236424 A | 9/1993 |

OTHER PUBLICATIONS

Echizen et al., "General Quality Maintenance Module for Motion Picture Watermarking," IEEE Trans. on Consumer Electronics, vol. 45, No. 4, Nov. 1999, pp. 1150-1158.*

Suthaharan et al., "Perceptually Tuned Video Watermarking Scheme using Motion Entropy Masking," Proc. IEEE Region 10 Conf., Sep. 1999, pp. 182-185.*

Deguillaume et al., "Robust 3D DFT Video Watermarking," Proc. SPIE vol. 3657: Security and Watermarking of Multimedia Contents, Jan. 1999, pp. 113-124.*

Swanson et al., "Multiresolution Scene-Based Video Watermarking Using Perceptual Models," IEEE Journal on Selected Areas in Communications, vol. 16, No. 4, May 1998, pp. 540-550.*

Barni et al., "Object watermarking for MPEG-4 video streams copyright protection," Proc. SPIE vol. 3971: Security and Watermarking of Multimedia Contents II, Jan. 2000, pp. 465-476.

Kim et al., "An Object-based Video Watermarking," Proc. Int. Conf. on Consumer Electronics, Jun. 1999, pp. 100-101.

Swanson et al., "Object-Based Transparent Video Watermarking," Proc. IEEE First Workshop on Multimedia Signal Processing, Jun. 1997, pp. 369-374.

Szepanski, "Compatibility Problems in Add-On Data Transmission for TV-Channels," 2d Symp. and Tech. Exh. On Electromagnetic Compatibility, Jun. 28, 1977, pp. 263-268.

Szepanski, "Binary Data Transmission Over Video Channels with Very Low Amplitude Data Signals," Fernseh- und Kino-Technik, vol. 32, No. 7, Jul. 1978, pp. 251-256 (German text with full English translation).

Szepanski, Additive Binary Data Transmission for Video Signals, Conference of the Communications Engineering Society, 1980, NTG Technical Reports, vol. 74, pp. 343-351 (German text with full English translation).

U.S. App. No. 60/308,718, Lubin et al., filed Jul. 30, 2001.

* cited by examiner

TIME-VARYING VIDEO WATERMARK

RELATED APPLICATION DATA

This patent application is a continuation of U.S. patent application Ser. No. 09/951,142, filed Sep. 10, 2001 (Now U.S. Pat. No. 6,961,444), which claims the benefit of U.S. Provisional Patent Application 60/232,163, filed Sep. 11, 2000.

TECHNICAL FIELD

The invention relates to steganography, digital watermarking, and data hiding.

BACKGROUND AND SUMMARY

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark. Several particular watermarking techniques have been developed. The reader is presumed to be familiar with the literature in this field. Particular techniques for embedding and detecting imperceptible watermarks in media signals are detailed in the assignee's U.S. Pat. Nos. 6,122,403 and 6,614,914, which are hereby incorporated by reference. Examples of other watermarking techniques are described in U.S. patent application Ser. No. 09/404,292, which is hereby incorporated by reference. Additional features of watermarks relating to authentication of media signals and fragile watermarks are described in U.S. Pat. Nos. 6,574,350 and 6,636,615, and U.S. Patent application Ser. No. 60/198,138 and 60/232,163, which is hereby incorporated by reference.

The problem with video watermarking is that many static image based watermark systems or static watermarking systems have been adapted to video, where "static" refers to processes that do not account for changes of multimedia content over time. However, video is dynamic with respect to time. For example, a mostly invisible image watermark may be visible in video because as the image changes and the watermark remains the same, the watermark can be visibly perceived. In other words, the problem is that the watermark may be mostly invisible in each frame, but the motion of an object through the stationary watermark makes the watermark visible in video. Similarly, an invisible watermark in a video may be visible in each frame, just as artifacts due to lossy compression are imperceptible in video, yet visible if individual frames of the video are examined as still images. It is believed that our eyes and brain average these effects over time to remove the distortion.

This disclosure provides a method of embedding a digital watermark into a video signal using a time-based perceptual mask such that the digital watermark is substantially imperceptible in the video signal. In other words, the watermark is reduced in value where it can be perceived due to the dynamics of video as described above. A digital watermark embedder computes a time based perceptual mask comprising gain values corresponding to locations within a frame. The gain value for a location in the frame is changed as a function of the change in one or more pixel values at the location over time. The embedder uses the gain values of the time based perceptual mask to control embedding of corresponding elements of a digital watermark signal such that the perceptibility of the elements of the digital watermark signal is reduced in time varying locations of the video signal. This inter-frame time-based gain coefficient can be combined with intra-frame spatial-based gain coefficients that make watermarks mostly invisible in each frame based upon static-image perception, or less visible in each static frame and completely invisible in video based upon spatial video perceptual theory or experimentation.

An alternative method is to segment objects and have the watermarks move with each object, labeled object-based masking. The segmentation must be accurate to alleviate edge effects. This method may be very applicable with MPEG-4 where the video is stored as individual objects.

One aspect of the invention is a method of embedding a digital watermark into a video signal such that the digital watermark is substantially imperceptible in the video signal. The method computes a watermark signal corresponding to locations within a frame, where the watermark signal is mapped to locations in the video frame and is computed based upon attributes of the video within the frame. The method varies the strength of the watermark signal over time. The process of varying the strength includes reducing the strength of the watermark signal to make the digital watermark less perceptible in the video in locations where the video has time varying properties. The method embeds the watermark signal into the video at the locations with the varying strength.

Another embedding method computes a watermark signal corresponding to locations within the video, where the watermark signal is mapped to locations in the video and is computed based upon attributes of the video within the frame. The method varies the strength of the watermark signal over time, the varying including selectively reducing the strength of the watermark signal relative to a reference value to make the digital watermark less perceptible in the video in locations where the video has time varying properties that otherwise cause the watermark signal to be more perceptible. The method embeds the watermark signal into the video at the locations with the varying strength.

Further features of the invention will become apparent from the following detailed description and accompanying drawing.

DETAILED DESCRIPTION

Time-based Masking of Video Watermarks

Figure 1:
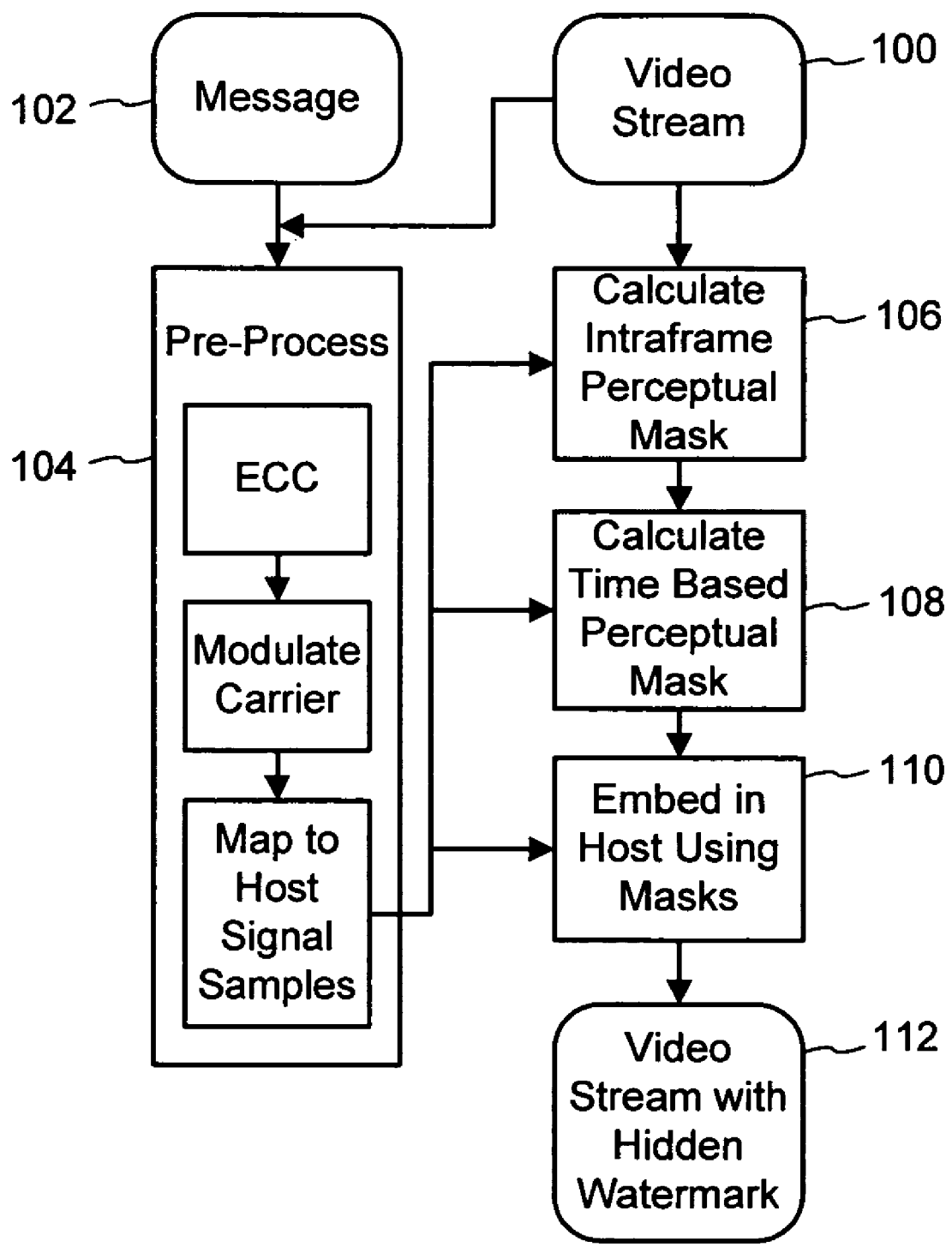
FIG. 1 illustrates a diagram of a digital watermark embedder for video using time based perceptual masking to reduce visibility of the watermark.

An improvement is to change the gain of the watermark depending upon the dynamic attributes of the local area around the watermark. Specifically, if the pixel represents a changing or moving area, the watermark is reduced in value, unless the movement is chaotic or noise-like, in which case the gain can remain large.

More specifically, given the current value for one pixel, if that current value is similar to the values before and after the current frame (for the same pixel), the watermark gain, labeled time-gain, for that pixel should be near 1. The time-gain should drop as the values of that pixel change in time, as long as the change is steady over time. The more the steady change, the smaller the time gain, where change can be measured as absolute difference or statistical variance. This should be repeated for each pixel or group of pixels in the frame. However, if the change in the pixel or group of pixels is chaotic or noise-like, the time gain can remain near 1 since noisy environments are a good place to hide watermarks. In addition, we may want to look only at the frame before and after or two or more frames in each time-direction. To this end, if the pixel represents a changing or moving area, the watermark is reduced in value.

Alternatively, one may want to determine the gain only from past values so that the system is causal and the embedder causes no delay. This can be accomplished by using the past values to calculate the gain directly or to estimate the future value and calculate the gain using this estimate. In one embodiment, the estimate(s) can be dependent upon the slope and change in slope of the current pixel value and previous values, and the resulting time-gain can be based upon the variance of the three existing values and estimated value(s). The predictive frames used in most video compression schemes, such as MPEG p and b frames, can be used to set the time gain.

FIGURE 1 illustrates a diagram of a digital watermark embedder for video using time based perceptual masking to reduce visibility of the watermark. The inputs to the embedder include a video stream 100 and an auxiliary data message to be imperceptibly embedded into the video stream. Conceptually, there are two components of the embedder: a message pre-processor for transforming the auxiliary data into an intermediate signal for embedding into the host video stream, and a human perceptibility system analyzer for computing a mask used to control the embedding of the intermediate signal into the host video stream.

The message pre-processor transforms the message signal into an intermediate signal according to a protocol for the desired digital watermark application. This protocol specifies embedding parameters, like:

the size of the message as well as number and meaning of data fields in the message;
  the symbol alphabet used for the message elements, e.g., binary, M-ary etc.
  the type of error correction coding applied to the message;
  the type of error detection scheme applied to the message;
  the type and nature of the carrier signal modulated with the message signal;
  the sample resolution, block size, and transform domain of the host signal to which elements of the intermediate are mapped for embedding; etc.

The example shown in FIGURE 1 pre-processes as follows (104). First, it applies error correction coding to the message, such as turbo, BCH, convolutional, and/or Reed Solomon coding. Next it adds error detection bits, such as parity bits and/or Cyclic Redundancy Check (CRC) bits. The message 102 includes fixed bits (e.g., a known pattern of bits to verify the message and synchronize the reader) and variable bits to carry variable data, such as frame number, transaction ID, time stamp, owner ID, content ID, distributor ID, copy control instructions, adult rating, etc.

The embedder modulates the message with a carrier signal, such as a pseudo random sequence, features of the host video signal 100, or both. The embedder also maps elements of the intermediate signal to samples in the host video signal (e.g., particular samples in the spatial or frequency domain of the video signal). The mapping function preferably replicates instances of the message throughout the video signal, yet scrambles the message instances such that they are more difficult to visually perceive and detect through analysis of the video stream. For more about message processing for digital watermark embedding, see U.S. Pat. Nos. 6,122,403 and 6,614,914.

The human perceptibility analyzer calculates an "intraframe" perceptual mask (106) based on spatial visual attributes within a frame. This mask provides a vector of gain values corresponding to locations within the frame and indicating the data hiding capacity of the image at these locations in the frame. These gain values are a function of signal activity (e.g., a measure of local variance, entropy, contrast), luminance, and edge content (as measured by an edge detector or high pass filter) at locations within the frame. Locations with higher signal activity and more dense edge content have greater data hiding capacity, and therefore, the signal energy with which the intermediate signal is embedded can be increased. Similarly, the changes made to the host signal due to the embedding of the watermark can be increased in these areas. Further examples of such perceptual masking are provided in U.S. Pat. Nos. 6,122,403 and 6,614,914.

The human perceptibility analyzer also calculates a time based perceptual mask (108) as introduced above. The time based perceptual analyzer determines how pixels in a local area change over time (e.g., from frame to frame), and adjust the gain of the perceptual mask accordingly. If the pixels in the local area change less then a predetermined threshold, then the gain in the perceptual mask is relatively unchanged. If the pixels in the local area change in a smoothly varying manner over time, then the gain in the perceptual mask is reduced to reduce the visibility of the digital watermark. Finally, if the pixels in the local area change in a highly varying manner, e.g., in a chaotic or substantially random manner, then the gain in the perceptual mask is increased to reflect the increased data hiding capacity of that location in the video stream.

As noted previously, there are a variety of ways to measure the time varying changes of pixels at a location. One way is to use a statistical measure such as the mean, variance or standard deviation, and change in variance or standard deviation of pixel values (e.g., luminance) over time at a location. For example, a variance near 0, i.e. below a pre-determined threshold, identifies a stationary area-results in a time-gain near or greater than 1. A variance greater than the threshold with minimal change in variance identifies a smoothly varying location, resulting in a time-gain below 1. A variance greater than the threshold but with a large change in variance identifies a noisy area, resulting in a time-gain near or greater than 1.

Another measure is the absolute change of a pixel value at a location, along with the time-derivative or rate of change of the absolute change in pixel value. A related measure is to determine how a pixel is changing by measuring absolute value and/or changes in motion vectors for that location (e.g., pixel or block of pixels). Calculating motion vectors is well known in the state of the art of video compression. For compressed video streams, this motion vector data is part of the data stream, and be used to determine the gain for embedding the intermediate signal in spatial domain samples or frequency domain coefficients (e.g., DCT or wavelet coefficients). For example, a non-near zero (i.e. above the pre-determined threshold) smoothly varying motion vector identifies a smoothly changing location and results in a reduced time-gain value. A near zero motion vector or chaotically changing motion vector identifies a stationary or noisy location, respectively, and both result in a time-gain value near or above 1.

Alternatively, the system may use color values or combinations of colors that are more accurate than luminance to predict perceptibility of the watermark. For example, psycho-visual research may determine that watermarks are more visible in red during motion, and the system can be adapted to accommodate this finding.

The optimal value of the time-gain will be determined via human perception experiments with actual video.

After computing the perceptual mask in blocks 106 and 108, the embedder uses the mask to control embedding of the intermediate signal into the host video stream. In one implementation, for example, the gain is applied as a scale factor to the intermediate signal, which in turn, is added to corresponding samples of the video signal (e.g., either spatial or frequency domain samples). The result is a video stream with a hidden digital watermark 112.

A further innovation is to apply a time varying dither signal to control the strength of the digital watermark signal at locations corresponding to pixels or groups of pixels (e.g., 8 by 8 block of DCT coefficients, group of wavelet subband coefficients, etc.) in the host video stream. This dither signal is preferably random, such as a pseudo random signal generated by a pseudorandom number generator (a cryptographic hash). It may be implemented by applying it to the intra frame gain or to the time-varying gain of the digital watermark signal. The dither creates a perturbation of the gain value. For example, if the gain value is one, the dither creates a fractional perturbation around the value of one.

In one implementation, the dither for a pixel or group of neighboring pixel locations in a video stream varies over time and relative to the dither for neighboring pixel or group locations. In effect, the dither creates another form of time varying gain. The dither signal improves the visual quality of the digitally watermarked video signal, particularly in areas where the watermark might otherwise cause artifacts due to the difference in time varying characteristics of the host video signal relative to the watermark signal. The dither signal may be used with or without the time varying gain calculations described in this document. Further, the user should preferably be allowed to turn the dither on or off as well as vary the gain of the dither in the digital watermark embedding environment (on a frame, video object, or video scene basis).

Object-Based Masking of Video Watermarks

Another method to provide invisible watermarks for video is object-based masking. The method is to segment objects and have the watermarks move with each object, referred to as object-based masking. The digital watermark for one or each video object is designed to be invisible spatially within the object, and since the watermark moves with the object, motion cannot make the watermark visible.

The segmentation must be accurate to alleviate edge effects. The segmentation can be performed on the composite video or on each video stream before the final mixing.

If all objects are embedded, the system should take care to make sure that the watermarks do not interfere with each other. In one such embodiment, the background is not watermarked. In another, the objects contain payloads that are all spatially synchronized with a low-level background calibration signal (for example, subliminal graticules disclosed in U.S. Pat. No. 6,122,403). This calibration signal is not perceptible and helps the system synchronize with each object's bit carrying payload.

After one or more objects are watermarked, the video is saved as composite, such as in MPEG-2, or in an object based method, such as MPEG-4 formatted video. In other words, the composite video may be created before distribution or at the player. For MPEG-2, the embedding system can guarantee that payloads for each object do not interfere with each other. For MPEG-4, each object's watermark payload can be read before rendering, or can be designed not to interfere with the composite video.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the embedding processes may be implemented in a programmable computer or a special purpose digital circuit. Similarly, detecting processes may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

I claim:

1. A method of embedding a digital watermark into a video signal such that the digital watermark is substantially imperceptible in the video signal, the method comprising:
    computing a watermark signal corresponding to locations within a frame, where the watermark signal is mapped to locations in the video frame and is computed based upon attributes of the video within the frame;
    varying strength of the watermark signal over time; the varying including reducing the strength of the watermark signal to make the digital watermark less perceptible in the video in locations where the video has time varying properties; and
    embedding the watermark signal into the video at the locations with the varying strength.

2. The method of claim 1 wherein the watermark signal corresponds to a carrier signal that is modulated to carry variable message data.

3. The method of claim 2 wherein the modulated carrier is based on a pseudorandom sequence.

4. The method of claim 1 wherein the watermark signal is mapped in a manner that scrambles locations of watermark elements in the video signal.

5. The method of claim 1 wherein the strength of the watermark signal is varied relative to a reference value.

6. The method of claim 5 wherein the reference value comprises a gain value used to control strength of the watermark signal.

7. The method of claim 6 wherein the reference value is further dependent on an intra frame gain computed based on non-temporal attributes within a frame.

8. The method of claim 5 wherein the watermark signal is varied relative to the reference value according to a dither signal.

9. A machine readable medium on which is stored instructions for performing a method of embedding a digital watermark into a video signal such that the digital watermark is substantially imperceptible in the video signal, the method comprising:

computing a watermark signal corresponding to locations within a frame, where the watermark signal is mapped to locations in the video frame and is computed based upon attributes of the video within the frame;

varying strength of the watermark signal over time; the varying including reducing the strength of the watermark signal to make the digital watermark less perceptible in the video in locations where the video has time varying properties; and embedding the watermark signal into the video at the locations with the varying strength.

10. The machine readable medium of claim 9 wherein the watermark signal corresponds to a carrier signal that is modulated to carry variable message data.

11. The machine readable medium of claim 10 wherein the modulated carrier is based on a pseudorandom sequence.

12. The machine readable medium of claim 9 wherein the watermark signal is mapped in a manner that scrambles locations of watermark elements in the video signal.

13. The machine readable medium of claim 9 wherein the strength of the watermark signal is varied relative to a reference value.

14. The machine readable medium of claim 13 wherein the reference value comprises a gain value used to control strength of the watermark signal.

15. The machine readable medium of claim 14 wherein the reference value is further dependent on an intra frame gain computed based on non-temporal attributes within a frame.

16. The machine readable medium of claim 13 wherein the watermark signal is varied relative to the reference value according to a dither signal.

17. A method of embedding a digital watermark into a video signal such that the digital watermark is substantially imperceptible in the video signal, the method comprising:

computing a watermark signal corresponding to locations within the video, where the watermark signal is mapped to locations in the video and is computed based upon attributes of the video within the frame;

varying strength of the watermark signal over time; the varying including selectively reducing the strength of the watermark signal relative to a reference value to make the digital watermark less perceptible in the video in locations where the video has time varying properties that otherwise cause the watermark signal to be more perceptible; and embedding the watermark signal into the video at the locations with the varying strength.

18. The method of claim 17 wherein varying the strength includes varying the strength as a function of changes in pixel values over time.

19. The method of claim 17 wherein varying the strength includes varying according to a dither signal.

20. The method of claim 17 wherein varying includes varying based on a prediction of future changes in pixel values based on past changes in pixel values.

* * * * *